United States Patent
Kim et al.

(10) Patent No.: US 11,902,991 B2
(45) Date of Patent: Feb. 13, 2024

(54) METHOD AND APPARATUS FOR TRANSMITTING AND RECEIVING DOWNLINK CONTROL INFORMATION IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 17/429,805

(22) PCT Filed: Feb. 11, 2020

(86) PCT No.: PCT/KR2020/001926
§ 371 (c)(1),
(2) Date: Aug. 10, 2021

(87) PCT Pub. No.: WO2020/166947
PCT Pub. Date: Aug. 20, 2020

(65) Prior Publication Data
US 2022/0132541 A1     Apr. 28, 2022

(30) Foreign Application Priority Data
Feb. 11, 2019   (KR) .................. 10-2019-0015752

(51) Int. Cl.
*H04W 72/23*   (2023.01)
*H04L 1/00*    (2006.01)
(Continued)

(52) U.S. Cl.
CPC ........... *H04W 72/23* (2023.01); *H04L 1/0003* (2013.01); *H04L 1/0061* (2013.01);
(Continued)

(58) Field of Classification Search
CPC ............. H04W 72/23; H04W 72/0453; H04W 72/1268; H04W 72/1273; H04L 1/0003; H04L 1/0072; H04L 1/1812
See application file for complete search history.

(56) References Cited

U.S. PATENT DOCUMENTS

2013/0265914 A1   10/2013 Ahn et al.
2015/0327281 A1   11/2015 Seo et al.
(Continued)

FOREIGN PATENT DOCUMENTS

CN   109196809 A     1/2019
EP   3 439 222 A2    2/2019
(Continued)

OTHER PUBLICATIONS

NTT Docomo et al.: "Offline summary for AI 7.1.3.3.4 UL data transmission procedure", 3GPP Draft; R1-1807640, 3rd Generation Partnership Project (3GPP), Mobile Competence Centre ; 650, Route Des, Lucioles ; F-06921 Sophia-Antipolis Cedex ; FRANCE, vol. RAN WG1, No. Busan, Korea; May 21, 2018-May 25, 2018 May 22, 2018.
(Continued)

*Primary Examiner* — Duc C Ho
(74) *Attorney, Agent, or Firm* — Jefferson IP Law, LLP

(57) ABSTRACT

The present disclosure relates to a communication technique for combining, with IoT technology, a 5G communication system for supporting a higher data transmission rate than a 4G system, and a system therefor. The present disclosure may be applied to intelligent services, such as smart homes, smart buildings, smart cities, smart cars or connected cars,
(Continued)

health care, digital education, retail, security and safety related services, and the like based on 5G communication technologies and IoT-related technologies. The present disclosure discloses a method and an apparatus for efficiently transmitting and receiving a downlink control channel in a CA environment.

20 Claims, 7 Drawing Sheets

(51) Int. Cl.
  *H04W 72/1268* (2023.01)
  *H04L 1/1812* (2023.01)
  *H04W 72/0453* (2023.01)
  *H04W 72/1273* (2023.01)

(52) U.S. Cl.
  CPC .......... *H04L 1/0072* (2013.01); *H04L 1/1812* (2013.01); *H04W 72/0453* (2013.01); *H04W 72/1268* (2013.01); *H04W 72/1273* (2013.01)

(56) References Cited

U.S. PATENT DOCUMENTS

| | | | |
|---|---|---|---|
| 2015/0341865 A1* | 11/2015 | Yang | H04W 72/0453 455/522 |
| 2019/0296878 A1 | 9/2019 | Yeo et al. | |
| 2021/0135946 A1 | 5/2021 | Babaei | |
| 2021/0298052 A1 | 9/2021 | Namba et al. | |
| 2021/0392627 A1* | 12/2021 | Kim | H04W 72/04 |

FOREIGN PATENT DOCUMENTS

| | | |
|---|---|---|
| JP | 2013/545421 A | 12/2013 |
| KR | 10-2016-0091491 A | 8/2016 |
| KR | 2018-0013650 A | 2/2018 |
| KR | 2018-0013673 A | 2/2018 |
| WO | 2011/108892 A2 | 9/2011 |
| WO | 2014/092364 A1 | 6/2014 |

OTHER PUBLICATIONS

Extended European Search Report dated Feb. 21, 2022, issued in European Application No. 20755954.3.
NTT Docomo, Inc., 'UL data transmission procedure', R1-1807068, 3GPP TSG RAN, WG1 Meeting #93, Busan, Korea, May 21-25, 2018.
Ericsson, 'Maintenance issues of DL/UL scheduling and HARQ procedure', R1-1811490, 3GPP TSG RAN WG1 Meeting #94bis, Chengdu, China, Oct. 8-12, 2018.
NTT Docomo, Inc., 'Offline discussion on remaining issues for UL transmission with configured grant', R1-1813935, 3GPP TSG RAN WG1, Meeting #95, Spokane, USA, Nov. 12-16, 2018.
Korean Office Action dated Mar. 2, 2023, issued in Korean Application No. 10-2019-0015752.
U.S. Notice of Allowance dated Oct. 19, 2023; U.S. Appl. No. 17/399,597.
Chinese Office Action with English translation dated Oct. 21, 2023; Chinese Appln. No. 202080013815.7.

* cited by examiner

METHOD AND APPARATUS FOR TRANSMITTING AND RECEIVING DOWNLINK CONTROL INFORMATION IN WIRELESS COMMUNICATION SYSTEM

TECHNICAL FIELD

The disclosure relates to a method and a device for transmitting or receiving downlink control information in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system defined by 3GPP is called a "New Radio (NR) system".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed in 5G communication systems and applied to the NR system.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Various studies have been conducted to efficiently transmit downlink control information in an environment in which carrier aggregation (CA) operates in a next-generation communication system.

DETAILED DESCRIPTION OF INVENTION

Technical Problem

An aspect of the disclosure is to propose a method for effectively transmitting or receiving downlink control information in an environment operating in carrier aggregation.

Solution to Problem

The disclosure for solving the above problem relates to a terminal method in a wireless communication system, and the method may include: receiving control information from a base station; if a cyclic redundancy check (CRC) of the control information is scrambled with a configured scheduling-radio network temporary identifier (CS-RNTI), and a new data indicator (NDI) field included in the control information is configured to 0, determining cancellation of scheduling for configured uplink grant type 2 or downlink semi-persistent scheduling (SPS) allocation; and based on specific fields included in the control information, determining cancellation for the configured uplink grant type 2 or the downlink SPS allocation, wherein values of a frequency domain resource allocation field among the specific fields are configured based onbased on a configured resource allocation type.

A base station method in a wireless communication system according to an embodiment of the disclosure may include: generating control information for indicating cancellation of scheduling for configured uplink grant type 2 or downlink semi-persistent scheduling (SPS) allocation for a terminal; and transmitting the control information to the terminal, wherein: a cyclic redundancy check (CRC) of the control information is scrambled with a configured scheduling-radio network temporary identifier (CS-RNTI), and a new data indicator (NDI) field included in the control information is configured to 0; specific fields included in the control information are used to indicate cancellation for the configured uplink grant type 2 or the downlink SPS allocation; and values of a frequency domain resource allocation field among the specific fields are configured based on a resource allocation type configured for the terminal.

A terminal in a wireless communication system according to an embodiment of the disclosure may include a transceiver, and a controller configured to: control the transceiver to receive control information from a base station; if a cyclic redundancy check (CRC) of the control information is scrambled with a configured scheduling-radio network temporary identifier (CS-RNTI), and a new data indicator (NDI) field included in the control information is configured to 0, determine cancellation of scheduling for configured uplink grant type 2 or downlink semi-persistent scheduling (SPS)

allocation; and based on specific fields included in the control information, determine cancellation for the configured uplink grant type 2 or the downlink SPS allocation, wherein values of a frequency domain resource allocation field among the specific fields are configured based on a configured resource allocation type.

A base station in a wireless communication system according to an embodiment of the disclosure may include: a transceiver; and a controller configured to generate control information for indicating cancellation of scheduling for configured uplink grant type 2 or downlink semi-persistent scheduling (SPS) allocation for a terminal, and control the transceiver to transmit the control information to the terminal, wherein: a cyclic redundancy check (CRC) of the control information is scrambled with a configured scheduling-radio network temporary identifier (CS-RNTI), and a new data indicator (NDI) field included in the control information is configured to 0; specific fields included in the control information are used to indicate cancellation for the configured uplink grant type 2 or the downlink SPS allocation; and values of a frequency domain resource allocation field among the specific fields are configured based on a resource allocation type configured for the terminal.

Advantageous Effects of Invention

Based on the method for transmitting or receiving downlink control information, which is proposed in the disclosure, transmission or reception of downlink control information between a base station and a terminal, which is based on a 5G communication system, can be efficiently performed.

MODE FOR THE INVENTION

Figure 1:
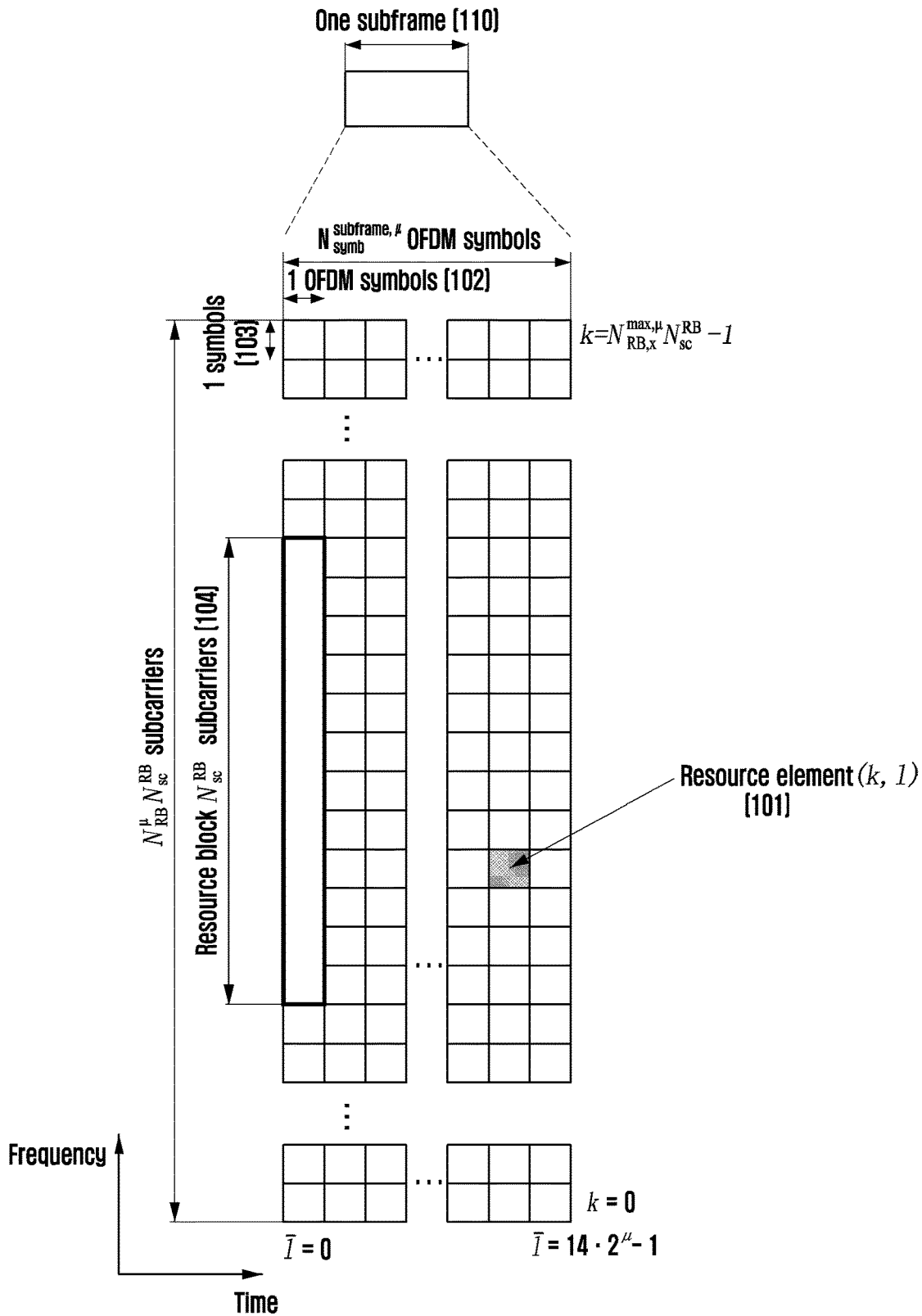
FIG. 1 is a diagram illustrating a basic structure of a time-frequency domain in 5G according to an embodiment of the disclosure.

Hereinafter an embodiment will be described in detail with the accompanying drawings. Hereinafter, an embodiment of the disclosure will be described using a 5G system as an example, but the embodiment of the disclosure may be applied to other communication systems having a similar technical background or channel type. For example, LTE or LTE-A mobile communication and a mobile communication technology developed after 5G may be included therein. Accordingly, the embodiment of the disclosure may also be applied to other communication systems via some modifications without significantly departing from the scope of the disclosure, according to determination by those skilled in the art.

Further, in describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. Further, the disclosure is applicable to FDD and TDD systems. Further, in the following description, embodiments of the disclosure will be described through examples of NR or LTE/LTE-A systems, but the embodiments of the may also be applied to other communication systems with similar technical backgrounds or channels types. Further, based on determinations by those skilled in the art, the embodiments of the disclosure may be applied to other communication systems through some modifications without significantly departing from the scope of the disclosure.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

Wireless communication systems have been developed from an initial wireless communication system providing a voice-oriented service to a broadband wireless communication system providing a high-speed and high-quality packet data service, such as those according to communication standards including a high-speed packet access (HSPA) of 3GPP, long-term evolution (LTE) (or evolved universal terrestrial radio access (E-UTRA)), LTE-advanced (LTE-A), LTE-Pro, high rate packet data (HRPD) of 3GPP2, ultra-mobile broadband (UMB), and 802.16e of IEEE.

In an LTE system, which is a representative example of the broadband wireless communication system, a downlink (DL) adopts an orthogonal frequency division multiplexing (OFDM) scheme and an uplink (UL) adopts a single-carrier frequency division multiple access (SC-FDMA) scheme. The uplink is a radio link via which a terminal (user equipment (UE) or mobile station (MS)) transmits data or a control signal to a base station (BS) (or an eNode B), and the downlink is a radio link via which a base station transmits data or a control signal to a terminal. In such a multiple-access scheme, data or control information of each user may be distinguished by allocating and operating time-frequency resources, at which data or control information of each user is transmitted, so as not to overlap each other, that is, to establish orthogonality.

A 5G communication system, as a future communication system after LTE, should be able to freely reflect various requirements of users, service providers, etc., so that the 5G communication system should be able to support services that simultaneously satisfy various requirements. For example, services considered for the 5G communication system include an enhanced mobile broadband (eMBB) communication, massive machine type communication (mMTC), ultra-reliability low latency communication (URLLC), and the like.

The eMBB aims to provide a data transmission rate that is more improved than a data transmission rate supported by existing LTE, LTE-A or LTE-Pro. For example, in the 5G communication system, an eMBB should be able to provide a maximum data rate (peak data rate) of 20 Gbps in downlink and a maximum data rate of 10 Gbps in uplink from the perspective of one base station. The 5G communication system need to provide a maximum data rate while providing an increased actual perceived data rate (user perceived data rate) of a terminal. In order to satisfy these requirements, improvement of various transmission/reception technologies including a more advanced multi-input multi-output (MIMO) transmission technology is required. In addition, in a band of 2 GHz used by current LTE, a signal is transmitted using a maximum transmission bandwidth of 20 MHz, whereas, in the 5G communication system, a data transmission rate, which is required by the 5G communication system, may be satisfied by using a frequency bandwidth wider than 20 MHz in a frequency band of 3 to 6 GHz or a frequency band of 6 GHz or higher.

Meanwhile, mMTC is being considered to support application services, such as the Internet of things (IoT), in the 5G communication system. In order to efficiently provide the IoT, mMTC may require support for large-scale terminal access in a cell, improved coverage of a terminal, an improved battery time, a reduced cost of a terminal, and the like. The IoT is attached to multiple sensors and various devices to provide communication functions, so that the IoT should be able to support a large number of terminals (for example, 1,000,000 terminals/km2) within a cell. Due to the nature of a service, a terminal that supports mMTC is likely to be located in a shaded area, which cannot be covered by a cell, such as the basement of a building, and therefore a wider coverage may be required compared to other services provided by the 5G communication system. The terminal that supports mMTC may be required to be a low-cost terminal, and since it is difficult to frequently replace a battery of the terminal, a very long battery life time, such as 10 to 15 years, may be required.

The URLLC is a cellular-based wireless communication service used for a specific purpose (mission-critical). For example, services, etc. used for a remote control of a robot or machinery, industrial automation, an unmanned aerial vehicle, remote health care, an emergency alert, and the like may be considered. Therefore, communication provided by URLLC should also provide very low latency and very high reliability. For example, a service that supports URLLC has requirements of an air interface latency less than 0.5 milliseconds and a packet error rate of 10-5 or less at the same time. Therefore, for the service that supports the URLLC, the 5G system should provide a transmit time interval (TTI) that is smaller than those of other services, and also requires a design to allocate wide resources in the frequency band in order to secure reliability of a communication link.

Three services of 5G, which are eMBB, URLLC, and mMTC, may be multiplexed and transmitted in one system. Different transmission/reception techniques and transmission/reception parameters may be used between services in order to satisfy different requirements of respective services.

Hereinafter, a frame structure of the 5G system will be described in more detail with reference to the drawings.

FIG. 1 is a diagram illustrating a basic structure of a time-frequency domain that is a radio resource area in which data or a control channel is transmitted in a 5G system according to an embodiment of the disclosure.

Referring to FIG. 1, a horizontal axis represents a time domain, and a vertical axis represents a frequency domain. A basic unit of a resource in the time and frequency domain is a resource element (RE) 101, and may be defined to be 1 orthogonal frequency division multiplexing (OFDM) symbol 102 on the time axis and 1 subcarrier 103 on the frequency axis. $N_{SC}^{RB}$ consecutive REs (for example, 12) in the frequency domain may constitute one resource block (RB) 104. n symbols 102 may constitute one subframe 110, and a length of a subframe may be 1.0 ms. The number of symbols included in one subframe 110 may vary according to subcarrier spacing.

Figure 2:
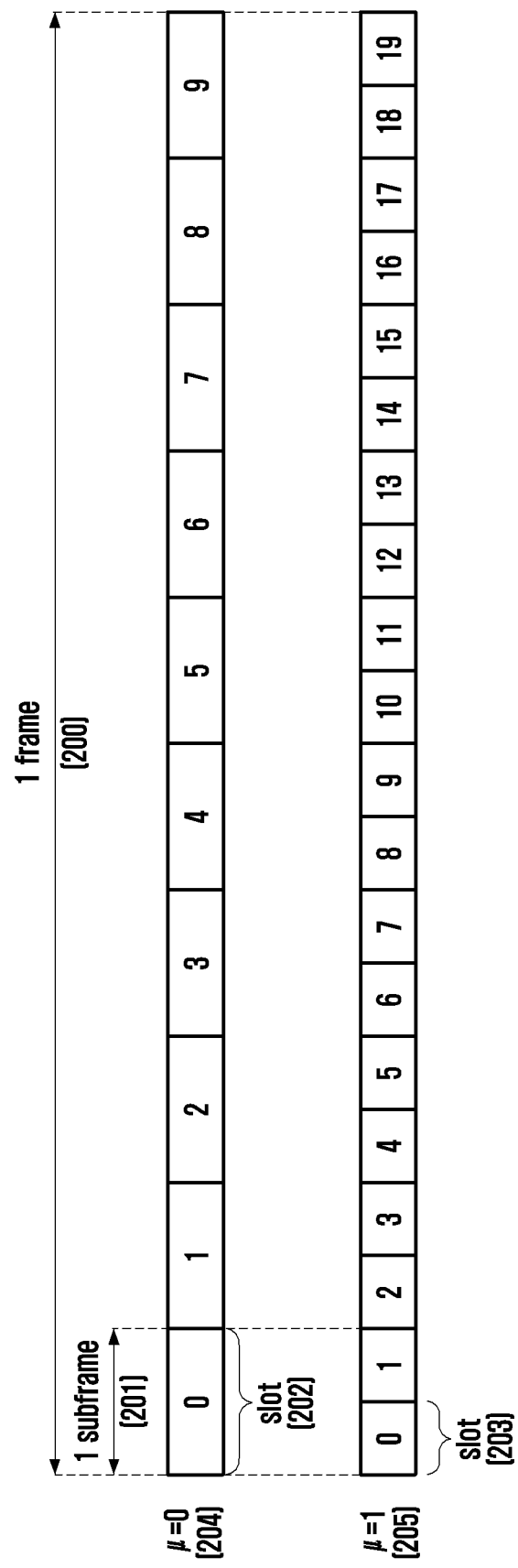
FIG. 2 is a diagram illustrating a structure of a frame, a subframe, and a slot in 5G according to an embodiment of the disclosure.

FIG. 2 is a diagram illustrating a slot structure considered in the 5G system according to an embodiment of the disclosure.

FIG. 2 illustrates an example of a structure of a frame 200, a subframe 201, and a slot 202. One frame 200 may be defined to be 10 ms. One subframe 201 may be defined to be 1 ms, and thus one frame 200 may include a total of 10 subframes 201. One slot 202 or 203 may be defined as 14 OFDM symbols (that is, the number of symbols per slot ($N_{symb}^{slot}$=14). One subframe 201 may include one or multiple slots 202 and 203, and the number of slots 202 and 203 for one subframe 201 may vary according to a configuration value μ 204 or 205 for subcarrier spacing. The example of FIG. 2 illustrates a case 204 where a subcarrier spacing configuration value μ=0 and a case 205 where a subcarrier spacing configuration value μ=1. In the case 204 where μ=0, one subframe 201 may include one slot 202, and in the case 205 where μ=1, one subframe 201 may include two slots 203. That is, the number ($N_{slot}^{subframe,\mu}$) of slots per subframe may vary according to the configuration value μ for the subcarrier spacing, and accordingly, the number ($N_{slot}^{frame,\mu}$) of slots per frame may vary. $N_{slot}^{subframe,\mu}$ and $N_{slot}^{frame,\mu}$ according to respective subcarrier spacing configurations μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in the 5G communication system will be described in detail with reference to the drawings.

Figure 3:
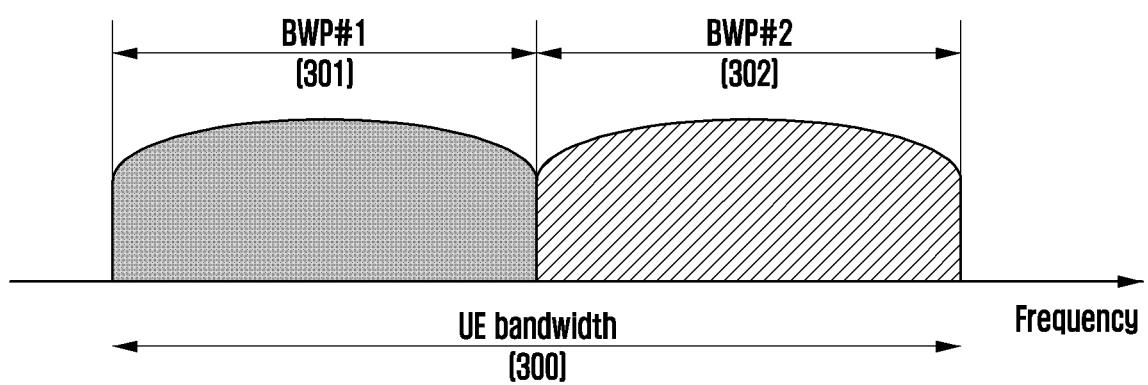
FIG. 3 is a diagram illustrating an example of a bandwidth part configuration in 5G according to an embodiment of the disclosure.

FIG. 3 is a diagram illustrating an example of a configuration for a bandwidth part in the 5G communication system according to an embodiment of the disclosure.

FIG. 3 shows an example in which a terminal bandwidth (UE) 300 is configured to be two bandwidth parts that are bandwidth part #1 301 and bandwidth part #2 302. A base station may configure one or multiple bandwidth parts to a terminal, and may configure the following information for each bandwidth part.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (cyclic prefix) | |
| } | |

In addition to the configuration information, various parameters related to the bandwidth parts may be configured to the terminal. The base station may transfer the information to the terminal via higher layer signaling, for example, RRC signaling. At least one bandwidth part among the configured one or multiple bandwidth parts may be activated. Whether the configured bandwidth is activated may be semi-statically transferred via RRC signaling or may be dynamically transmitted via DCI, from the base station to the terminal.

The terminal before an RRC connection may be configured for an initial bandwidth part (BWP) for initial access, from the base station via a master information block (MIB). More specifically, in an initial access stage, the terminal may receive configuration information for a search space and a control area (control resource set (CORESET)) in which PDCCH for receiving system information (correspond to remaining system information (RMSI) or system information block 1 (SIB 1)) required for initial access may be transmitted via the MIB. Each of the search space and the control area configured via the MIB may be considered as identifier (identity (ID)) 0. The base station may notify the terminal of configuration information, such as frequency allocation information, time allocation information, and numerology for control area #0, via the MIB. In addition, the base station may notify the terminal of configuration information for a monitoring period and occasion for control area #0, that is, the configuration information for search space #0, via the MIB. The terminal may consider a frequency domain configured to control area #0, which is obtained from the MIB, as an initial bandwidth part for initial access. In this case, an identifier (ID) of the initial bandwidth part may be considered to be 0.

The configuration of a bandwidth part supported by the 5G may be used for various purposes.

For example, when a bandwidth supported by the terminal is smaller than a system bandwidth, this may be supported via the bandwidth part configuration. For example, by configuring, for the terminal, a frequency position (configuration information 2) of the bandwidth part, the terminal may transmit or receive data at a specific frequency position within the system bandwidth.

As another example, for the purpose of supporting different numerologies, the base station may configure multiple bandwidth parts for the terminal. For example, in order to support both data transmission and reception using a subcarrier spacing of 15 kHz and a subcarrier spacing of 30 kHz for the terminal, two bandwidth parts may be configured to use the subcarrier spacings of 15 kHz and 30 kHz, respectively. Different bandwidth parts may be frequency-division-multiplexed, and when data is to be transmitted or received at a specific subcarrier spacing, a bandwidth part configured at the subcarrier spacing may be activated.

As another example, for the purpose of reducing power consumption of the terminal, the base station may configure, for the terminal, a bandwidth part having a different bandwidth size. For example, if the terminal supports a very large bandwidth, for example, 100 MHz, and always transmits or receives data via the corresponding bandwidth, very large power consumption may occur. In particular, in a situation where there is no traffic, it is very inefficient, in terms of power consumption, to perform monitoring for an unnecessary downlink control channel with a large bandwidth of 100 MHz. For the purpose of reducing the power consumption of the terminal, the base station may configure, for the terminal, a bandwidth part of a relatively small bandwidth, for example, a bandwidth part of 20 MHz. In the situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) in an initial access stage. More specifically, a terminal may be configured for a control area (control resource set (CORESET)) for a downlink control channel via which downlink control information (DCI) for scheduling of a system information block (SIB) may be transmitted from an MIB of a physical broadcast channel (PBCH). The bandwidth of the control area, which is configured via the MIB may be considered to be the initial bandwidth part, and the terminal may receive PDSCH, via which the SIB is transmitted, via the configured initial bandwidth part. In addition to reception of the SIB, the initial bandwidth part may be used for other system information (OSI), paging, and random access.

Next, downlink control information (DCI) in the 5G system will be described in detail.

In the 5G system, scheduling information for uplink data (or physical uplink data channel (physical uplink shared channel, PUSCH)) or downlink data (or physical downlink data channel (physical downlink shared channel, PDSCH)) is transferred from the base station to the terminal via DCI. The terminal may monitor a DCI format for fallback and a DCI format for non-fallback with respect to PUSCH or PDSCH. The fallback DCI format may include a fixed field predefined between the base station and the terminal, and the non-fallback DCI format may include a configurable field.

The DCI may be transmitted on a physical downlink control channel (PDCCH) via channel coding and modulation. A cyclic redundancy check (CRC) is attached to a DCI message payload, and the CRC is scrambled with a radio network temporary identifier (RNTI) corresponding to the identity of the terminal. Different RNTIs are used according to the purpose of the DCI message, for example, terminal (UE)-specific data transmission, a power control command, or a random access response. That is, the RNTI is not explicitly transmitted, but is included in CRC calculation and transmitted. When the DCI message transmitted on PDCCH is received, the terminal checks the CRC by using an allocated RNTI, and if a CRC check result is correct, the terminal may know that the message has been transmitted to the terminal.

For example, DCI for scheduling of PDSCH for system information (SI) may be scrambled with an SI-RNTI. DCI for scheduling of PDSCH for a random access response (RAR) message may be scrambled with an RA-RNTI. DCI for scheduling of PDSCH for a paging message may be scrambled with a P-RNTI. DCI for notification of a slot format indicator (SFI) may be scrambled with an SFI-RNTI. DCI for notification of a transmit power control (TPC) may be scrambled with a TPC-RNTI. DCI for scheduling of terminal-specific PDSCH or PUSCH may be scrambled with a cell RNTI (C-RNTI).

DCI format 0_0 may be used as fallback DCI for scheduling of PUSCH, wherein the CRC is scrambled with the C-RNTI. DCI format 0_0 in which the CRC is scrambled with the C-RNTI may include, for example, the following information.

TABLE 3

- Identifier for DCI formats - [1] bit
- Frequency domain resource assignment
- [ ⌈ $log2(N_{RB}^{UL, BWP}(N_{RB}^{UL, BWP}+1)/2)$ ⌉ ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- UL/supplementary UL (SUL) indicator - 0 or 1 bit DCI format 0_1 may be used as non-fallback DCI for scheduling of PUSCH, wherein the CRC is scrambled with the C-RNTI. DCI format 0_1 in which the CRC is scrambled with the C-RNTI may include, for example, the following information.

TABLE 4-1

- Carrier indicator - 0 or 3 bits
- UL/SUL indicator - 0 or 1 bit
- Identifier for DCI formats - [1] bits
- Bandwidth part indicator - 0, 1 or 2 bits TABLE 4-1-continued

- Frequency domain resource assignment
* For resource allocation type 0, $\lceil N_{RB}^{UL, BWP}/P \rceil$ bits
* For resource allocation type 1, $\lceil log2(N_{RB}^{UL, BWP}(N_{RB}^{UL, BWP}+1)/2) \rceil$ bits
- Time domain resource assignment -1, 2, 3, or 4 bits
- virtual resource block (VRB)-to-physical resource block (PRB) mapping - 0 or 1 bit, only for resource allocation type 1.
* 0 bit if only resource allocation type 0 is configured;
* 1 bit otherwise.
- Frequency hopping flag - 0 or 1 bit, only for resource allocation type 1.
* 0 bit if only resource allocation type 0 is configured;
* 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits

TABLE 4-2

1 bit for semi-static HARQ-ACK codebook;
2 bits for dynamic HARQ-ACK codebook with single HARQ-ACK codebook.
   2nd downlink assignment index - 0 or 2 bits
2 bits for dynamic HARQ-ACK codebook with two HARQ-ACK sub-codebooks;
0 bit otherwise.
   TPC command for scheduled PUSCH - 2 bits SRS resource indicator - $\left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based PUSCH transmission.
$\lceil \log_2(N_{SRS}) \rceil$ bits for codebook based PUSCH transmission.
   Precoding information and number of layers - up to 6 bits
   Antenna ports - up to 5 bits
   SRS request - 2 bits
   CSI request - 0, 1, 2, 3, 4, 5, or 6 bits
   Code block group (CBG) transmission information - 0, 2, 4, 6, or 8 bits
   phase tracking reference signal-demodulation reference signal relationship (PTRS-DMRS association) - 0 or 2 bits TABLE 4-2-continued beta_offset indicator - 0 or 2 bits
   demodulation reference signal (DMRS) sequence initialization - 0 or 1 bit It is preferable to understand that Tables 4-1 and 4-2 are connected to each other.

DCI format 1_0 may be used as fallback DCI for scheduling of PDSCH, wherein the CRC is scrambled with C-RNTI. DCI format 0_1 in which the CRC is scrambled with the C-RNTI may include, for example, the following information.

TABLE 5

- Identifier for DCI formats - [1] bit
- Frequency domain resource assignment - $\lceil \lceil log2(N_{RB}^{DL, BWP}(N_{RB}^{DL, BWP}+1)/2) \rceil \rceil$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- physical uplink control channel (PUCCH) resource indicator - 3 bits
- PDSCH-to-HARQ feedback timing indicator - [3] bits DCI format 1_1 may be used as non-fallback DCI for scheduling of PUSCH, wherein the CRC is scrambled with the C-RNTI. DCI format 1_1 in which the CRC is scrambled with the C-RNTI may include, for example, the following information.

TABLE 6-1

- Carrier indicator - 0 or 3 bits
- Identifier for DCI formats - [1]bits
- Bandwidth part indicator - 0, 1 or 2 bits
- Frequency domain resource assignment
* If resource allocation type 0 is configured, NRBG bits
* If resource allocation type 1 is configured,
$\lceil \lceil log2(N_{RB}^{DL, BWP}(N_{RB}^{DL, BWP}+1)/2) \rceil \rceil$ bits
* If both resource allocation type 0 and 1 are configured,
max($\lceil log2(N_{RB}^{DL, BWP}(N_{RB}^{DL, BWP}+1)/2) \rceil$, NRBG)+1 bits
- Time domain resource assignment -1, 2, 3, or 4 bits
- VRB-to-PRB mapping - 0 or 1 bit, only for resource allocation type 1.
* 0 bit if only resource allocation type 0 is configured;

TABLE 6-2

* 1 bit otherwise.
  - Physical resource block (PRB) bundling size indicator - 0 or 1 bit
  - Rate matching indicator - 0, 1, or 2 bits
  - Zero power (ZP) CSI-RS trigger - 0, 1, or 2 bits
For transport block 1:
  - Modulation and coding scheme - 5 bits
  - New data indicator - 1 bit
  - Redundancy version - 2 bits
For transport block 2:
  - Modulation and coding scheme - 5 bits
  - New data indicator - 1 bit
  - Redundancy version - 2 bits
  - HARQ process number - 4 bits
  - Downlink assignment index - 0 or 2 or 4 bits
  - TPC command for scheduled PUCCH - 2 bits
  - PUCCH resource indicator - 3 bits
  - PDSCH-to-HARQ feedback timing indicator - 3 bits
  - Antenna ports - 4, 5 or 6 bits
  - Transmission configuration indication - 0 or 3 bits
  - SRS request - 2 bits
  - CBG transmission information - 0, 2, 4, 6, or 8 bits
  - CBG flushin out information - 0 or 1 bit
  - DMRS sequence initialization - 1 bit It is preferable to understand that Tables 6-1 and 6-2 are connected to each other.

Hereinafter, a downlink control channel in the 5G communication system will be described in more detail with reference to the drawings.

Figure 4:
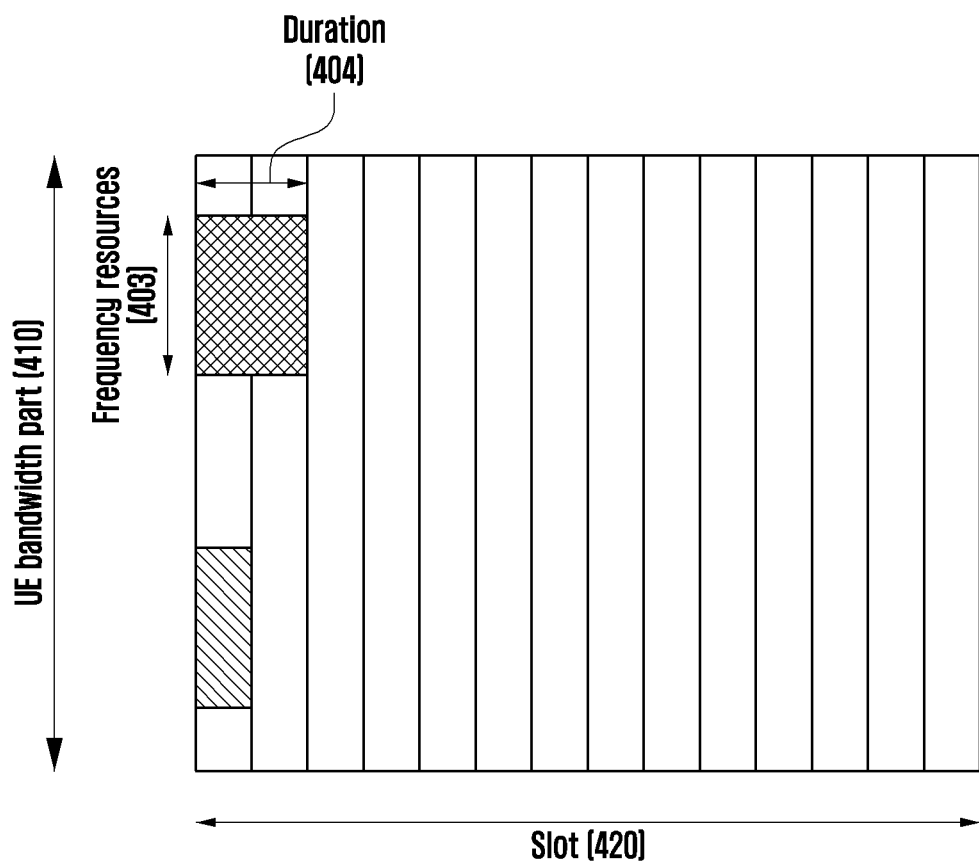
FIG. 4 is a diagram illustrating an example of a control area configuration of a downlink control channel in 5G according to an embodiment of the disclosure.

FIG. 4 is a diagram illustrating an example of a control area (control resource set (CORESET)) in which a downlink control channel is transmitted in the 5G wireless communication system according to an embodiment of the disclosure.

FIG. 4 shows an example in which a bandwidth part 410 of a terminal is configured on the frequency axis, and two control areas (control area #1 401 and control area #2 402) are configured within one slot 420 on the time axis. The control areas 401 and 402 may be configured for a specific frequency resource 403 within the entire terminal bandwidth part 410 on the frequency axis. One or multiple OFDM symbols may be configured on the time axis, which may be defined as a control area length (control resource set duration) 404. In the example of FIG. 4, control area #1 401 is configured to be a control area length of 2 symbols, and control area #2 402 is configured to be a control area length of 1 symbol.

The control area in the 5G described above may be configured for the terminal by a base station via higher layer signaling (e.g., system information, master information block (MIB), and radio resource control (RRC) signaling). Configuration of a control area for the terminal refers to providing information, such as an identifier (identity) of the control area, a frequency position of the control area, and a symbol length of the control area. For example, the following information may be included.

TABLE 7

```
ControlResourceSet ::=          SEQUENCE {
  -- Corresponds to L1 parameter 'CORESET-ID'
  controlResourceSetId          ControlResourceSetId,
  (control area identifier (Identity))
    frequencyDomainResources    BIT STRING (SIZE (45)),
  (frequency axis resource allocation information)
    duration                    INTEGER (1..maxCoReSetDuration),
```

TABLE 7-continued

```
  (time axis resource allocation information)
    cce-REG-MappingType         CHOICE {
  (CCE-to-REG mapping scheme)
    interleaved                 SEQUENCE {
      reg-BundleSize            ENUMERATED {n2, n3, n6},
    (REG bundle size)
      precoderGranularity       ENUMERATED
  {sameAsREG-bundle, allContiguousRBs},
      interleaverSize           ENUMERATED {n2, n3, n6}
    (interleaver size)
      shiftIndex
      INTEGER(0..maxNrofPhysicalResourceBlocks-1)
      OPTIONAL
        (interleaver shift (Shift))
    },
    nonInterleaved              NULL
    },
    tci-StatesPDCCH             SEQUENCE(SIZE (1..maxNrofTCI-
StatesPDCCH)) OF TCI-StateId   OPTIONAL,
    (QCL(Quasi Co-Location) configuration information)
      tci-PresentInDCI          ENUMERATED {enabled}
                                OPTIONAL, -- Need S
}
```

In Table 7, tci-StatesPDCCH (simply referred to as TCI state) configuration information may include information of one or more synchronization signal (SS)/physical broadcast channel (PBCH) block indexes or channel state information reference signal (CSI-RS) indexes having a quasi co location (QCL) relationship with DMRS transmitted in the corresponding control area.

Figure 5:
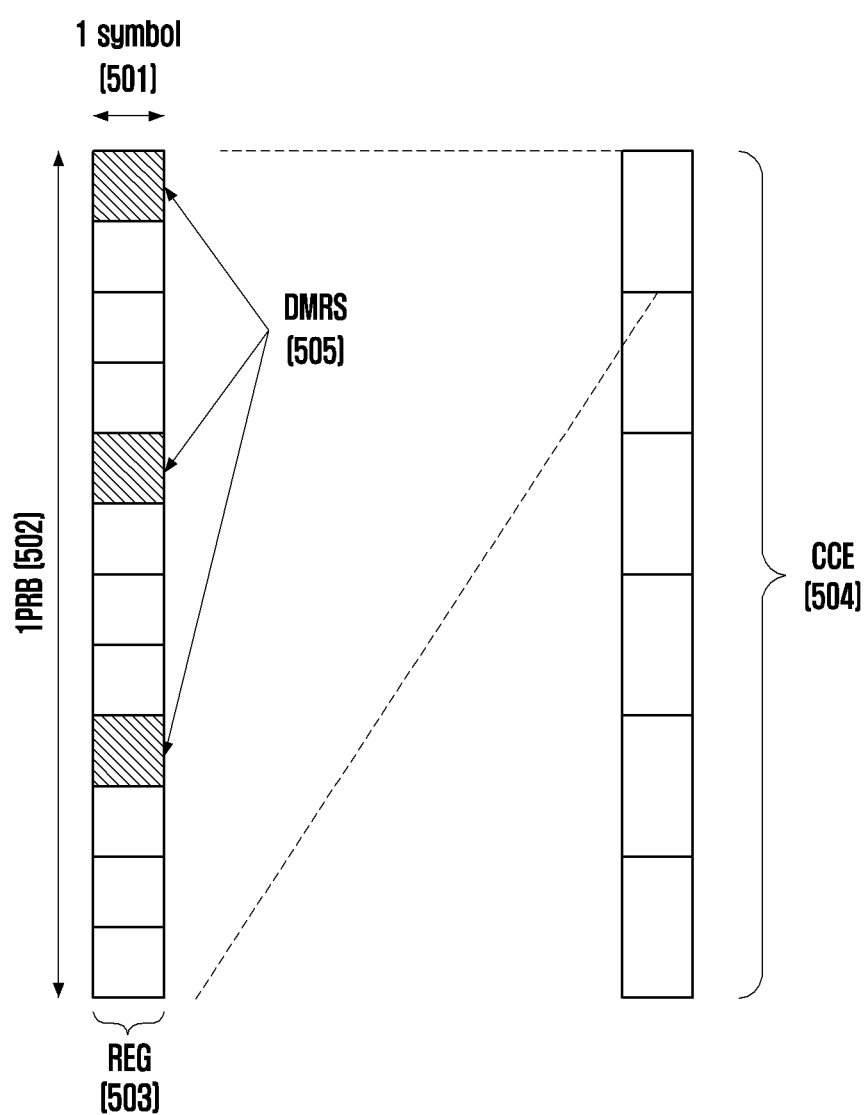
FIG. 5 is a diagram illustrating a structure of a downlink control channel in 5G according to an embodiment of the disclosure.

FIG. 5 is a diagram showing an example of a basic unit of a time resource and a frequency resource constituting a downlink control channel which may be used in the 5G according to an embodiment of the disclosure.

According to FIG. 5, a basic unit of time and frequency resources constituting a control channel is referred to as a resource element group (REG) 503, and a REG 503 may be defined to have 1 OFDM symbol 501 on the time axis and 1 physical resource block (PRB) 502, that is, 12 subcarriers, on the frequency axis. A downlink control channel allocation unit may be configured by concatenating the REG 503.

As illustrated in FIG. 5, when a basic unit for allocation of a downlink control channel in the 5G is a control channel element (CCE) 504, 1 CCE 504 may include a plurality of REGs 503. Referring to the REG 503 illustrated in FIG. 5 as an example, the REG 503 may include 12 REs, and if 1 CCE 504 includes 6 REGs 503, this represents that 1 CCE 504 may include 72 REs. When a downlink control area is configured, the area may include multiple CCEs 504, and a specific downlink control channel may be mapped to one or multiple CCEs 504 and transmitted according to an aggregation level (AL) within the control area. The CCEs 504 within the control area are classified by numbers, and the numbers may be assigned according to a logical mapping scheme.

The basic unit of the downlink control channel illustrated in FIG. 5, that is, the REG 503, may include both REs, to which DCI is mapped, and an area to which a (DMRS) 505, which is a reference signal for decoding the REs, is mapped. As shown in FIG. 5, 3 DMRSs 505 may be transmitted in 1 REG 503.

The number of CCEs required to transmit PDCCH may be 1, 2, 4, 8, or 16 depending on the aggregation level (AL), and different numbers of CCEs may be used to implement link adaptation of the downlink control channel. For example, if AL=L, one downlink control channel may be transmitted via the L number of CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level. Since there are various aggregation levels that make one bundle with 1, 2, 4, 8, or 16 CCEs, the terminal has multiple search spaces. The search space set may be defined as a set of search spaces at all configured aggregation levels.

The search space may be classified into a common search space and a terminal (UE)-specific search space. A certain group of terminals or all terminals may examine a common search space of PDCCH in order to receive cell-common control information, such as a dynamic scheduling or paging message for system information. For example, PDSCH scheduling allocation information for transmission of an SIB including cell operator information, etc. may be received by examining the common search space of PDCCH. In the case of the common search space, the certain group of terminals or all terminals need to receive PDCCH, and may thus be defined as a set of predetermined CCEs. Scheduling allocation information for terminal-specific PDSCH or PUSCH may be received by examining the terminal-specific search space of PDCCH. The terminal-specific search space may be defined terminal-specifically based on the identity of the terminal and functions of various system parameters.

In the 5G, a parameter for the search space of PDCCH may be configured from the base station to the terminal via higher layer signaling (e.g., SIB, MIB, and RRC signaling). For example, the base station may configure, to the UE, the number of PDCCH candidates at each aggregation level L, a monitoring period for a search space, a monitoring occasion per symbol in a slot for the search space, a search space type (common search space or terminal-specific search space), a combination of an RNTI and a DCI format, which is to be monitored in the search space, a control area index for monitoring the search space, etc. For example, the following information may be included.

TABLE 8

```
SearchSpace ::=                             SEQUENCE {
-- Identity of the search space. SearchSpaceId = 0 identifies the SearchSpace
configured via PBCH (MIB) or ServingCellConfigCommon.
searchSpaceId                               SearchSpaceId,
(search space identifier)
controlResourceSetId                        ControlResourceSetId,
(control area identifier)
monitoringSlotPeriodicityAndOffset          CHOICE {
(monitoring slot level period)
   sl1                                        NULL,
   sl2                                        INTEGER (0..1),
   sl4                                        INTEGER (0..3),
   sl5                                        INTEGER (0..4),
   sl8                                        INTEGER (0..7),
   sl10                                       INTEGER (0..9),
   sl16                                       INTEGER (0..15),
   sl20                                       INTEGER (0..19)
}
   OPTIONAL,
monitoringSymbolsWithinSlot                 BIT STRING (SIZE (14))
   OPTIONAL,
(monitoring symbol in slots)
nrofCandidates                              SEQUENCE {
(number of PDCCH candidates per aggregation level)
   aggregationLevel1                          ENUMERATED {n0, n1, n2, n3,
n4, n5, n6, n8},
   aggregationLevel2                          ENUMERATED {n0, n1, n2, n3,
n4, n5, n6, n8},
   aggregationLevel4                          ENUMERATED {n0, n1, n2, n3,
n4, n5, n6, n8},
   aggregationLevel8                          ENUMERATED {n0, n1, n2, n3,
n4, n5, n6, n8},
   aggregationLevel16                         ENUMERATED {n0, n1, n2, n3,
n4, n5, n6, n8}
},
searchSpaceType                             CHOICE {
(search space type)
-- Configures this search space as common search space (CSS) and DCI
formats to monitor.
   common                                     SEQUENCE {
(Common search space)
   }
   ue-Specific                                SEQUENCE {
(terminal (UE)-specific search space)
-- Indicates whether the UE monitors in this USS for DCI formats 0-0 and 1-
0 or for formats 0-1 and 1-1.
   formats                                    ENUMERATED {formats0-0-And-
1-0, formats0-1-And-1-1},
   ...
}
```

According to the configuration information, the base station may configure one or more search space sets for the terminal. For example, the base station may configure search space set 1 and search space set 2 for the terminal, may configure DCI format A, which is scrambled with an X-RNTI in search space set 1, to be monitored in the common search space, and may configure DCI format B, which is scrambled with an Y-RNTI in search space set 2, to be monitored in the terminal-specific search space. According to the configuration information, one or multiple search space sets may exist in the common search space or the terminal-specific search space. For example, search space set #1 and search space set #2 may be configured to be the common search space, and search space set #3 and search space set #4 may be configured to be the terminal-specific search space.

In the common search space, the following combinations of DCI formats and RNTIs may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the terminal-specific search space, the following combinations of DCI formats and RNTIs may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and uses.

Cell RNTI (C-RNTI): For terminal-specific PDSCH scheduling

Temporary Cell RNTI (TC-RNTI): For terminal-specific PDSCH scheduling

Configured scheduling RNTI (CS-RNTI): For semi-statically configured terminal-specific PDSCH/PUSCH scheduling Random Access RNTI (RA-RNTI): For PDSCH scheduling in a random access operation Paging RNTI (P-RNTI): For scheduling PDSCH via which paging is transmitted System Information RNTI (SI-RNTI): For scheduling PDSCH via which system information is transmitted Interruption RNTI (INT-RNTI): For notification of whether PDSCH is punctured Transmit Power Control for PUSCH RNTI (TPC-PUSCH-RNTI): For indicating a power control command for PUSCH Transmit Power Control for PUCCH RNTI (TPC-PUCCH-RNTI): For indicating a power control command for PUCCH Transmit Power Control for SRS RNTI (TPC-SRS-RNTI): For indicating a power control command for SRS The DCI formats specified above may follow the definition below.

TABLE 9

| DCI format | Usage |
|---|---|
| 0_0 | Scheduling of PUSCH in one cell |
| 0_1 | Scheduling of PUSCH in one cell |

TABLE 9-continued

| DCI format | Usage |
|---|---|
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

1st Embodiment

The base station may configure a control area for the terminal and may configure a transmission configuration indicator (TCI) state for the control area. Based on the TCI state configured in the control area, the terminal may determine an RS (e.g., SS/PBCH block or CSI-RS) which is in a quasi-co-located (QCL) relationship with a DMRS transmitted in the control area. For example, the following information may be provided as a TCI state configuration for the control area.

TABLE 10

```
TCI-State information element
TCI-State ::=              SEQUENCE {
  tci-StateId              TCI-StateId,
  qcl-Type1                QCL-Info,
  qcl-Type2                QCL-Info              OPTIONAL,
    -- Need R
  ...
}
QCL-Info ::=               SEQUENCE {
  cell                     ServCellIndex         OPTIONAL,
    -- Need R
  bwp-Id                   BWP-Id                OPTIONAL,
    -- Cond CSI-RS-Indicated
  referenceSignal          CHOICE {
    csi-rs                 NZP-CSI-RS-ResourceId,
    ssb                    SSB-Index
  },
  qcl-Type                 ENUMERATED {typeA, typeB, typeC, typeD},
  ...
}
```

The base station may configure one or multiple TCI states for the terminal with respect to a specific control area, and may activate one of the configured TCI states via a MAC CE activation command. For example, {TCI state #0, TCI state #1, TCI state #2} may be configured as TCI states for control area #1, and the base station may transmit, to the terminal via the MAC CE, a command for activating to assume TCI state #0 as the TCI state for control area #1. The terminal may correctly receive a DMRS of the control area based on QCL information within the activated TCI state, based on the activation command for the TCI state, which is received via the MAC CE. For a control area (control area #0) the index of which is configured to 0, if the terminal has failed to receive the MAC CE activation command for the TCI state of control area #0, the terminal may assume that a DMRS transmitted in control area #0 has been QCL with an SS/PBCH block identified during an initial access or a non-contention-based random access that is not triggered by a PDCCH command.

For a control area (control area #X) the index of which is configured to a value other than 0, if the terminal has failed to be configured for a TCI state for control area #X, or has received more than one TCI states but has failed to receive the MAC CE activation command to activate one of the received TCI states, the terminal may assume that a DMRS transmitted in control area #X has been QCL with the SS/PBCH block identified during the initial access.

The base station may operate in carrier aggregation (CA) by configuring one or more cells for the terminal. Cells in which the terminal performs transmission or reception may be classified into a primary cell (PCell) and a secondary cell (SCell). The primary cell may correspond to a first cell accessed by the terminal via an initial access procedure. In addition to the primary cell, the secondary cell may correspond to a cell further configured for communication, for the terminal by the base station via higher layer signaling.

If one or more secondary cells are configured, the base station may activate or deactivate the secondary cells via configured medium access control (MAC) control element (CE) signaling.

When the terminal has received a MAC CE corresponding to the activation command for the secondary cell in slot n, the terminal may activate the secondary cell at a time, which is not earlier than slot n+k (k=k1+3*$N^{subframe,\mu}_{slot}$+1, where k1 is a PDSCH-to-PUCCH HARQ-ACK timing, and $N^{subframe,\mu}_{slot}$ is defined as the number of slots per subframe for subcarrier configuration μ) and is not later than slot n+k′(k′=$T_{HARQ}$+$T_{activation\_time}$+$T_{CSI\_Reporting}$, where $T_{HARQ}$ is an HARQ-ACK timing for DL data transmission, $T_{activation\_time}$ is an activation delay for the secondary cell, and $T_{CSI\_Reporting}$ is a delay for CSI reporting), and thus perform the following operations in the activated secondary cell.

Transmission of sounding reference signal (SRS) in secondary cell
CSI reporting for secondary cell
PDCCH monitoring in secondary cell
PDCCH monitoring for secondary cell
PUCCH transmission in secondary cell (if configured)

If the terminal has received a MAC CE corresponding to the deactivation command for the secondary cell in slot n, or if a deactivation timer for the secondary cell (sCellDeactivationTimer) has expired, the terminal may complete deactivation for the secondary cell at a time not later than n+k″ (k″=$T_{HARQ}$+3 ms).

As described above, the terminal having received the MAC CE activation command for the secondary cell in slot n may complete activation of the secondary cell in slot n+k′ at the latest, and may perform PDCCH monitoring on the secondary cell. If no TCI state has been configured for a control area configured in the secondary cell, or if more than one TCI states have been configured, but the MAC CE activation command for activating one of the TCI states has not been received, additional definition may need to be provided regarding whether the terminal is able to assume that the DMRS transmitted in the control area of the activated secondary cell has been QCL with a specific RS (e.g., SS/PBCH block or CSI-RS) and perform PDCCH monitoring.

The first embodiment of the disclosure proposes a method for performing PDCCH monitoring by a terminal in a secondary cell in the above-described situation.

At least one of the following methods or a method corresponding to a combination of more than one of the following methods may be applied.

Method 1

With respect to the control area of the secondary cell, if the terminal has failed to be configured for a TCI state for the control area, or has received more than one TCI states but has failed to receive the MAC CE activation command to activate one of the received TCI states, the terminal may assume that the DMRS transmitted in the control area has been QCL with the SS/PBCH block identified during the initial access.

Method 2

With respect to the control area of the secondary cell, if the terminal has failed to be configured for a TCI state for the control area, or has received more than one TCI states but has failed to receive the MAC CE activation command to activate one of the received TCI states, the terminal may not perform PDCCH monitoring for the control area.

Method 3

With respect to the control area of the secondary cell, if the terminal has failed to be configured for a TCI state for the control area, or has received more than one TCI states but has failed to receive the MAC CE activation command to activate one of the received TCI states, the base station may configure, for the terminal, whether it is possible to assume that the DMRS transmitted in the control area has been QCL with the SS/PBCH block identified during the initial access (a case where the assumption is possible is referred to as "configuration A", and a case where the assumption is impossible is referred to as "configuration B").

If the base station has configured configuration A for the terminal, with respect to the control area of the secondary cell, if the terminal has failed to be configured for a TCI state for the control area, or has received more than one TCI states but has failed to receive the MAC CE activation command to activate one of the received TCI states, the terminal may assume that the DMRS transmitted in the control area has been QCL with the SS/PBCH block identified during the initial access.

If the base station has configured configuration B for the terminal, with respect to the control area of the secondary cell, if the terminal has failed to be configured for a TCI state for the control area, or has received more than one TCI states but has failed to receive the MAC CE activation command to activate one of the received TCI states, the terminal may not perform PDCCH monitoring for the control area.

Method 4

If the terminal has received a MAC CE corresponding to the activation command for the secondary cell in slot n, the terminal may perform CSI reporting in slot n+k (k=k1+3*$N^{subframe,\mu}_{slot}$+1, where k1 is a PDSCH-to-PUCCH HARQ-ACK timing, and $N^{subframe,\mu}_{slot}$ is defined as the number of slots per subframe for subcarrier configuration μ).

With respect to the control area of the secondary cell, if the terminal has failed to be configured for a TCI state for the control area, or has received more than one TCI states but has failed to receive the MAC CE activation command to activate one of the received TCI states, the terminal may assume that the DMRS transmitted in the control area has been QCL with the CSI-RS identified during the reporting in aforementioned slot n+k.

Method 5

The base station may configure, for the terminal, at least one control area (referred to as "first control area") configured by only one TCI state in the secondary cell.

With respect to control areas other than the control area corresponding to the "first control area" among the control areas of the secondary cell, if the terminal has failed to be configured for a TCI state for the control area, or has received more than one TCI states but has failed to receive the MAC CE activation command to activate one of the received TCI states, the terminal may assume QCL based on TCI state configuration information configured in the "first control area", for the DMRS transmitted in the corresponding control areas.

For a specific example, if the terminal is configured for control area #1 of the secondary cell, for which TCI #1 is configured, and control area #2 of the secondary cell, for which {TCI #2, TCI #3} is configured, and has failed to receive a MAC CE activation command to activate the TCI state for control area #2, the terminal may monitor both control area #1 and control area #2 by assumption of TCI #1.

The aforementioned PDCCH transmission/reception method according to the first embodiment may be applied equally to a primary secondary cell (PS Cell) as well as a secondary cell.

2nd Embodiment

When the terminal operating in CA monitors PDCCH in multiple cells, the terminal may monitor the PDCCH by activating both an RF module and a BB module of each cell, and thus power consumption of the terminal may be greatly increased. In particular, transmission/reception with a cell in a high frequency band (corresponding to frequency range 2 (FR2) or above 6 GHz area) may consume much more power than transmission/reception with a cell in a low frequency band (corresponding to frequency range 1 (FR1) or below 6 GHz area), and therefore it may be very inefficient to monitor PDCCH in each cell in a situation where both a cell of FR1 and a cell of FR2 are configured. Therefore, for the purpose of reducing power consumption of the terminal, cross-carrier scheduling may be used. Cross-carrier scheduling may refer to an operation in which PDCCH transmitted from a specific cell (cell A) schedules PDSCH or PUSCH of another cell (cell B). For example, when the terminal is configured for the cell of FR1 and the cell of FR2, the terminal may monitor PDCCH only for the cell of FR1, and operation on scheduling information for the cell of FR2 may be performed in the cell of FR1. For the convenience of explanation, when cross-carrier scheduling is configured, a cell (i.e., a cell which receives downlink control information corresponding to downlink allocation or uplink approval) which performs scheduling is collectively referred to as "first cell", and a cell (i.e., a cell in which downlink or uplink data is actually scheduled so as to be transmitted or received, based on downlink control information) for which scheduling is performed is collectively referred to as "second cell".

For the purpose of configuring cross-carrier scheduling to the terminal by the base station, information (e.g., a cell index of a cell corresponding to a "first cell") on a "first cell" performing scheduling for a "second cell", a carrier indicator field (CIF) for the "second cell", and the like may be configured. For example, the following configuration information may be notified from the base station to the terminal via higher layer signaling (e.g., RRC signaling).

TABLE 11

| CrossCarrierSchedulingConfig ::= | SEQUENCE { | |
|---|---|---|
| schedulingCellInfo | CHOICE { | |
| own (self-carrier scheduling) | SEQUENCE { | -- No |
| cross carrier scheduling | | |
| cif-Presence | BOOLEAN | |
| }, | | |
| other (cross-carrier scheduling) | SEQUENCE { | -- Cross |
| carrier scheduling | | |
| schedulingCellId | ServCellIndex, | |
| (cell index of cell performing scheduling) | | |

TABLE 11-continued

| cif-InSchedulingCell | INTEGER (1..7) |
|---|---|
| (CIF value) | |
| } | |
| }, | |
| ... | |
| } | |

The terminal may monitor PDCCH for the cell configured for cross-carrier scheduling, in the cell corresponding to the "first cell". The terminal may determine an index of a cell scheduled based on received DCI from a carrier indicator field value within DCI format 0_1 or DCI format 1_1 and, on the basis thereof, may transmit or receive data in a cell indicated by a carrier indicator. The base station may transmit, the terminal, DCI corresponding to a PDCCH command (order) for the purpose (or the same purpose for requesting physical random access channel (PRACH) transmission) of triggering to perform a random access procedure. The terminal having received the PDCCH command from the base station may perform the random access procedure (or PRACH transmission in the same manner).

If the CRC of DCI format 1_0 is scrambled with C-RNTI, and all values of a frequency domain resource assignment field are set to "1", the terminal may consider corresponding DCI format 1_0 to be DCI corresponding to the PDCCH command. In this case, contents of respective fields of DCI format 1_0 corresponding to the PDCCH command may be as follows.

TABLE 12

- Identifier for DCI formats - 1 bit
- Frequency domain resource assignment - $\lceil log_2(N_{RB}^{DL, BWP}(N_{RB}^{DL, BWP}+1)/2) \rceil$ bits
- Random Access Preamble index - 6 bits
- UL/SUL indicator - 1 bit.
- SS/PBCH index - 5 bits
- PRACH Mask index - 4 bits
- Reserved bits - 10 bits DCI format 1_0 corresponding to the PDCCH command does not include a carrier indicator field (CIF), and therefore, in order to receive a PDCCH command for a specific cell, the terminal should always monitor PDCCH in the corresponding cell. Even if the specific cell is configured for cross-carrier scheduling, the terminal should always monitor DCI format 1_0 in the corresponding cell in order to perform the PDCCH command for the cell. Accordingly, there may be a problem in that power consumption of the terminal due to PDCCH monitoring may increase significantly. The second embodiment of the disclosure proposes a method for receiving, in another cell, DCI corresponding to a PDCCH command of a specific cell, that is, a method for performing cross-carrier signaling for a PDCCH command.

At least one of the following methods or a method corresponding to a combination of more than one of the following methods may be applied.

[Method 1]

The terminal may monitor DCI format 1_0 corresponding to a PDCCH command for a cell configured for cross-carrier scheduling, in a "first cell" configured for the corresponding cell.

If CRC of DCI format 1_0 is scrambled with C-RNTI, and all values of a frequency domain resource assignment field are set to "1", the terminal may consider corresponding DCI format 1_0 to be DCI corresponding to the PDCCH command.

If the terminal is configured with a carrier indicator field (that is, if there is a cell configured for cross-carrier scheduling), contents of respective fields of DCI format 1_0 corresponding to the PDCCH command may be as follows.

TABLE 13

- Identifier for DCI formats - 1 bit
- Carrier indicator - 3 bits
- Frequency domain resource assignment - $\lceil \log_2(N_{RB}^{DL,BWP}(N_{RB}^{DL,BWP}+1)/2) \rceil$ bits
- Random Access Preamble index - 6 bits
- UL/SUL indicator - 1 bit.
- SS/PBCH index - 5 bits
- PRACH Mask index - 4 bits
- Reserved bits - 7 bits If the terminal is not configured with a carrier indicator field (that is, if there is no cell configured for cross-carrier scheduling), the contents of respective fields of DCI format 1_0 corresponding to the PDCCH command may follow aforementioned Table 12.

Method 2

The terminal may monitor DCI format 1_0 corresponding to a PDCCH command for a cell configured for cross-carrier scheduling, in a "first cell" configured for the corresponding cell.

If CRC of DCI format 1_0 is scrambled with C-RNTI, and all values of a frequency domain resource assignment field are set to "1", the terminal may consider corresponding DCI format 1_0 to be DCI corresponding to the PDCCH command.

If the terminal is configured with a carrier indicator field (that is, when there is a cell configured for cross-carrier scheduling), contents of respective fields of DCI format 1_0 corresponding to the PDCCH command may be as follows.

TABLE 14

- Identifier for DCI formats - 1 bit
- Frequency domain resource assignment - $\lceil \log_2(N_{RB}^{DL,BWP}(N_{RB}^{DL,BWP}+1)/2) \rceil$ bits
- Random Access Preamble index - 6 bits
- UL/SUL indicator - 1 bit.
- SS/PBCH index - 5 bits
- PRACH Mask index - 4 bits
- Carrier indicator - 3 bits
- Reserved bits - 7 bits If the terminal is not configured with a carrier indicator field (that is, if there is no cell configured for cross-carrier scheduling), the contents of respective fields of DCI format 1_0 corresponding to the PDCCH command may follow aforementioned Table 12.

Method 3

The terminal may monitor DCI format 1_0 corresponding to a PDCCH command for a cell configured for cross-carrier scheduling, in a "first cell" configured for the corresponding cell.

If the CRC of DCI format 1_0 is scrambled with C-RNTI, and all values of a frequency domain resource assignment field are set to "1", the terminal may consider corresponding DCI format 1_0 to be DCI corresponding to the PDCCH command, wherein respective fields of DCI format 1_0 corresponding to the PDCCH command follow aforementioned Table 12.

If the terminal is configured with a carrier indicator field (that is, if there is a cell configured for cross-carrier scheduling), the terminal may consider, as a carrier indicator, 3 bits corresponding to a most significant bit (MSB) (or least significant bit (LSB)) among 10 bits corresponding to reserved bits within DCI corresponding to the PDCCH command Method 4

The terminal may monitor DCI format 1_1 corresponding to a PDCCH command for a cell configured for cross-carrier scheduling, in a "first cell" configured for the corresponding cell.

In a case where the terminal is configured with a carrier indicator field (that is, when there is a cell configured for cross-carrier scheduling), and the CRC of received DCI format 1_1 is scrambled with C-RNTI, if a resource allocation type is configured to "resource allocation type 0" only, and frequency domain resource assignment field values are all set to "0", the terminal may consider the received DCI format 1_1 to be DCI corresponding to the PDCCH command.

Alternatively, if the resource allocation type is configured to "resource allocation type 1" only, and the frequency domain resource assignment field values are all set to "1", the terminal may consider the received DCI format 1_1 to be DCI corresponding to the PDCCH command.

Alternatively, if the resource allocation type is configured to both "resource allocation type 0" and "resource allocation type 1", and the frequency domain resource assignment field values are all set to "0" or "1", the terminal may consider the received DCI format 1_1 to be DCI corresponding to the PDCCH command.

In this case, contents of respective fields of DCI format 1_1 corresponding to the PDCCH command may be as follows.

TABLE 15

- Identifier for DCI formats - 1 bit
- Carrier indicator - 3 bits
- Bandwidth part indicator - 0, 1 or 2 bits
- Frequency domain resource assignment
* If resource allocation type 0 is configured, $N_{RBG}$ bits
* If resource allocation type 1 is configured, $\lceil \log_2(N_{RB}^{DL,BWP}(N_{RB}^{DL,BWP}+1)/2) \rceil$ bits
* If both resource allocation type 0 and 1 are configured, $\max(\lceil \log_2(N_{RB}^{DL,BWP}(N_{RB}^{DL,BWP}+1)/2) \rceil, N_{RBG})+1$ bits
- Random Access Preamble index - 6 bits
- UL/SUL indicator - 1 bit.
- SS/PBCH index - 5 bits
- PRACH Mask index - 4 bits
- Carrier indicator - 3 bits
- Reserved bits - remaining beats 2-1th Embodiment The terminal may monitor DCI format 1_0 corresponding to a PDCCH command for a cell configured for cross-carrier scheduling, in a terminal-specific search space of a "first cell" configured in the corresponding cell.

That is, the terminal may apply aforementioned [Method 1], [Method 2] or [Method 3] of the second embodiment to DCI format 1_0 monitored in the terminal-specific search space of the "first cell".

3rd Embodiment

For the purpose of supporting non-approval-based transmission/reception for a downlink data channel (physical downlink shared channel (PDSCH)) or an uplink data channel (physical uplink shared channel (PUSCH)), the base station may configure various transmission/reception parameters and time and frequency transmission resources for the PDSCH and PUSCH, to the terminal in a semi-static manner.

More specifically, for the purpose of supporting downlink (DL) semi-persistent scheduling (SPS), the base station may configure the following information to the terminal via higher layer signaling (e.g., RRC signaling).

TABLE 16

SPS-Config ::=  SEQUENCE {
   periodicity (transmission period)   ENUMERATED {ms10, ms20, ms32, ms40, ms64, ms80, ms128, ms160, ms320, ms640,
     spare6, spare5, spare4, spare3, spare2, spare1},
   nrofHARQ-Processes (HARQ process number)   INTEGER (1..8),
   n1PUCCH-AN (HARQ transmission resource)   PUCCH-ResourceId OPTIONAL, -- Need M TABLE 16-continued mcs-Table (MCS table)   ENUMERATED {qam64LowSE} OPTIONAL, -- Need S
   ...
}

DL SPS may be configured in a primary cell or a secondary cell, and DL SPS may be configured in one cell within one cell group. In 5G, for two types of non-approval-based transmission methods for uplink (UL), non-approval-based UL transmission type-1 (may be referred to as UL grant Type 1) and non-approval-based UL transmission type-2 (may be referred to as UL grant Type 2) are supported.

For the purpose of supporting UL grant Type 2 for uplink to the terminal, the base station may configure the following information via higher layer signaling (e.g., RRC signaling).

TABLE 17

ConfiguredGrantConfig ::=   SEQUENCE {
   frequencyHopping (frequency hopping)   ENUMERATED {mode1, mode2} OPTIONAL, -- Need S,
   cg-DMRS-Configuration (DMRS configuration)   DMRS-UplinkConfig,
   mcs-Table   ENUMERATED {qam256, spare1} OPTIONAL, -- Need S
   mcs-TableTransformPrecoder (MCS table)   ENUMERATED {qam256, spare1} OPTIONAL, -- Need S
   uci-OnPUSCH (whether UCI is on PUSCH) SetupRelease { CG-UCI-OnPUSCH },
   resourceAllocation   (resource allocation type)   ENUMERATED { resourceAllocationType0, resourceAllocationType1, dynamicSwitch },
   rbg-Size (RBG size)   ENUMERATED {config2} OPTIONAL, --Need S
   powerControlLoopToUse(closed loop power control)   ENUMERATED {n0, n1},
   p0-PUSCH-Alpha (power control parameter)   P0-PUSCH-AlphaSetId,
   transformPrecoder (whether transform precoding is applied)   ENUMERATED {enabled} OPTIONAL, -- Need S
   nrofHARQ-Processes (HARQ process number)   INTEGER(1..16),
   repK (number of repetitions)   ENUMERATED {n1, n2, n4, n8},
   repK-RV (redundancy version)   ENUMERATED {s1-0231, s2-0303, s3-0000} OPTIONAL, -- Cond RepK
   periodicity (period)   ENUMERATED {
     sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12
   },
   configuredGrantTimer (configured grant timer)   INTEGER (1..64) OPTIONAL, -- Need R
}

The base station may transmit, to the terminal, DCI including a specific DCI field value, for the purpose of scheduling activation or scheduling release for DL SPS and UL grant Type 2. More specifically, the base station may configure a configured scheduling-RNTI (CS-RNTI) to the terminal, and the terminal may monitor a DCI format in which a CRC is scrambled with CS-RNTI. In a case where the CRC of the DCI format received by the terminal is scrambled with CS-RNTI, a new data indicator (NDI) is set to "0", and a DCI field satisfies Table xx below, the terminal may consider the DCI as an instruction activating transmission/reception for DL SPS or UL grant Type 2.

TABLE 18

|  | DCI format 0_0/0_1 | DCI format 1_0 | DCI format 1_1 |
|---|---|---|---|
| HARQ process number | set to all "0"s | set to all "0"s | set to all "0"s |
| Redundancy version | set to "00" | set to "00" | For the enabled transport block: set to "00" |

The base station may configure a configured scheduling-RNTI (CS-RNTI) to the terminal, and the terminal may monitor a DCI format in which CRC is scrambled with CS-RNTI. In a case where the CRC of the DCI format received by the terminal is scrambled with CS-RNTI, a new data indicator (NDI) is set to "0", and a DCI field satisfies Table xx below, the terminal may consider the DCI as an instruction releasing transmission/reception for DL SPS or UL grant Type 2.

TABLE 19

|  | DCI format 0_0 | DCI format 1_0 |
|---|---|---|
| HARQ process number | set to all "0"s | set to all "0"s |
| Redundancy version | set to "00"s | set to "00"s |
| Modulation and coding scheme | set to all "1"s | set to all "1"s |
| Frequency domain resource assignment | set to all "1"s | set to all "1"s |

The DCI indicating release for DL SPS or UL grant Type 2 follows a DCI format corresponding to DCI format 0_0 or DCI format 1_0, and DCI format 0_0 or DCI format 1_0 does not include a carrier indicator field (CIF), so that, in order to receive a release command for DL SPS or UL grant Type 2 for a specific cell, the terminal should always monitor PDCCH in a cell in which the DL SPS or UL grant Type 2 is configured. Even if the specific cell is configured for cross-carrier scheduling, the terminal should always monitor DCI format 1_0 or DCI format 0_0 in the corresponding cell in order to receive the release command for DL SPS or UL grant Type 2 configured in the cell. Accordingly, there may be a problem in that power consumption of the terminal due to PDCCH monitoring may increase significantly. The third embodiment of the disclosure proposes a method for receiving, in another cell, DCI corresponding to a release command for DL SPS or UL grant Type 2, that is, a method for performing cross-carrier signaling for the release command for DL SPS or UL grant Type 2.

At least one of the following methods or a method corresponding to a combination of more than one of the following methods may be applied.

Method 1

The terminal may monitor DCI format 0_0/1_0, in which the CRC is scrambled with CS-RNTI, corresponding to a release command for UL grant Type 2 or DL SPS for a cell configured for cross-carrier scheduling, in a "first cell" configured in the corresponding cell.

If the CRC of DCI format 0_0/1_0 received by the terminal is scrambled with CS-RNTI, a new data indicator (NDI) is set to "0", and a DCI field satisfies aforementioned Table 19, the terminal may consider DCI format 0_0/1_0 as a command to release DL SPS or UL grant Type 2.

If the terminal is configured with a carrier indicator field (that is, if there is a cell configured for cross-carrier scheduling), the terminal may consider, as a carrier indicator, 3 bits corresponding to a most significant bit (MSB) (or least significant bit (LSB)) among 4 bits corresponding to a "time domain resource allocation" field in DCI format 0_0/1_0 corresponding to the release command for the DL SPS or UL grant Type 2. The terminal may apply the received release command for the DL SPS or UL grant Type 2 to the cell indicated by the carrier indicator field.

[Method 2]

The terminal may monitor DCI format 0_1/1_1, in which the CRC is scrambled with CS-RNTI, corresponding to a release command for UL grant Type 2 or DL SPS for a cell configured for cross-carrier scheduling, in a "first cell" configured in the corresponding cell.

If the terminal is configured with a carrier indicator field (that is, if there is a cell configured for cross-carrier scheduling), the CRC of DCI format 0_1/1_1 received by the terminal is scrambled with CS-RNTI, a new data indicator (NDI) is set to "0", and a DCI field satisfies Table 20 and/or Table 21 below, the terminal may consider DCI format 0_1/1_1 as a command to release DL SPS or UL grant Type 2.

TABLE 20

|  | DCI format 0_1 |
|---|---|
| HARQ process number | set to all "0"s |
| Redundancy version | set to "00"s |
| Modulation and coding scheme | set to all "1"s |
| Frequency domain resource assignment | set to all '0's if only resource allocation type 0 is configured. set to all '1's if only resource allocation type 1 is configured. set to all '0' or '1's if both resource allocation type 0 and 1 are configured. |

TABLE 21

|  | DCI format 1_1 |
|---|---|
| HARQ process number | set to all "0"s |
| Redundancy version | set to "00"s |
| Modulation and coding scheme | set to all "1"s |
| Frequency domain resource assignment | set to all '0's if only resource allocation type 0 is configured. set to all '1's if only resource allocation type 1 is configured. set to all '0' or '1's if both resource allocation type 0 and 1 are configured. |

The terminal may determine a cell to which the release command for DL SPS or UL grant Type 2 is to be applied, based on a "carrier indicator" field value in DCI format 0_1/1_1 corresponding to the release command for the DL SPS or UL grant Type 2. That is, the terminal may apply the received release command for the DL SPS or UL grant Type 2 to the cell indicated by the carrier indicator field.

Method 3

DL SPS may be configured in a primary cell or a secondary cell, and may be configured in only one cell within one cell group. That is, the terminal may expect that only one DL SPS is to be configured within a specific cell group, and may thus expect to receive only one piece of DCI corresponding to a release command for DL SPS. Accordingly, when the terminal has received, in another cell, DCI corresponding to the release command for DL SPS configured in a specific cell, even if there is no carrier indicator field, it is possible to apply the received release command to the cell in which DL SPS is configured.

If DL SPS is configured in the specific cell, and the cell is configured for cross-carrier scheduling, the terminal may monitor DCI format 1_0, in which the CRC is scrambled with CS-RNTI, corresponding to the release command for DL SPS for the corresponding cell, in a "first cell" configured in the cell. If the CRC of DCI format 1_0 received in the "first cell" by the terminal is scrambled with CS-RNTI, a new data indicator (NDI) is set to "0", and a DCI field satisfies aforementioned Table 19, the terminal may consider DCI format 1_0 as the release command for DL SPS. The terminal may apply the received release command to the cell in which DL SPS is configured.

Method 4

UL grant Type 2 may be configured for each cell, and thus a plurality of UL grant Type 2 may be configured for a plurality of cells. If UL grant Type 2 is configured in a specific cell, and the cell is configured for cross-carrier scheduling, the terminal may monitor DCI format 0_0, in which the CRC is scrambled with CS-RNTI, corresponding to a release command for UL grant Type 2 for the corresponding cell, in a "first cell" configured in the cell. Here, a cell corresponding to the "first cell" is referred to as cell #0. If the CRC of DCI format 0_0 received in cell #0 by the terminal is scrambled with CS-RNTI, a new data indicator (NDI) is set to "0", and a DCI field satisfies Table 19, the terminal may consider DCI format 0_0 as the release command for UL grant Type 2. The terminal may apply the received release command to all cells, in which cell #0 is designated as a "first cell", among cells for which cross-carrier scheduling and UL grant Type 2 are configured. For a specific example, in a case where: UL grant Type 2 and cross-carrier scheduling are configured for each of cell #2, cell #3, and cell #4; cell #0 is configured to be a "first cell" in cell #2 and cell #3; and cell #1 is configured to be a "first cell" in cell #3, if DCI format 0_0 for releasing of UL grant Type 2 is received in cell #0, the terminal may apply the received release command to a release operation for UL grant Type 2 of cell #2 and cell #3 in which cell #0 is configured to be a "first cell".

3-1th Embodiment

In performing aforementioned [Method 1] of the third embodiment, the terminal may monitor DCI format 0_0/1_0, in which the CRC is scrambled with CS-RNTI, corresponding to the release command for UL grant Type 2 or DL SPS for the cell configured for cross-carrier scheduling, in the terminal-specific search space of the "first cell" configured in the corresponding cell.

That is, the terminal may apply aforementioned [Method 1] of the third embodiment to DCI format 0_0/1_0, in which the CRC is scrambled with CS-RNTI, wherein DCI format 0_0/1_0 is monitored in the terminal-specific search space of the "first cell".

4th Embodiment

The base station may configure multiple control areas to the terminal, and the configured control areas may be configured to overlap in time domain resources. Each of the configured control areas may be configured to have an identical or different TCI state. As QCL-related information which may be configured as a TCI state of a control area, a QCL type may be configured to be at least one of four types of {typeA, typeB, typeC, and typeD}. QCL typeD among the four types may be defined as a spatial Rx parameter of the terminal. The terminal may be limited to receive one QCL typeD-configured signal at a specific time point.

If the terminal is
configured for one cell or configured to operate in carrier aggregation in one identical frequency band, and
in a case where the terminal performs PDCCH monitoring for an overlapping PDCCH monitoring occasion with respect to multiple control areas which are configured for different QCL typeDs and overlap in the time domain,
if, among the overlapping control areas,
a control area associated with a search space set, the search space type of which is configured to be a common search space, exists, the terminal may monitor PDCCH corresponding to a control area configured to have a lowest control area index from among the control areas corresponding to the common search space. If there is no control area associated with a search space set, the search space type of which is configured to be a common search space, exists, the terminal may monitor PDCCH corresponding to a control area configured to have a lowest control area index from among the control areas corresponding to the terminal-specific search space.

The terminal may monitor one control area satisfying the aforementioned conditions or multiple control areas configured for the same QCL typeD as that of the corresponding control area.

If the terminal is
configured for one cell or configured to operate in carrier aggregation in one identical frequency band, and
in a case where the terminal performs PDCCH monitoring for an overlapping PDCCH monitoring occasion with respect to multiple control areas which are configured for the same QCL typeD and overlap in the time domain, or multiple control areas for which no TCI state is configured,
the terminal may perform PDCCH monitoring on all search space sets associated with overlapping different control areas.

Figure 6:
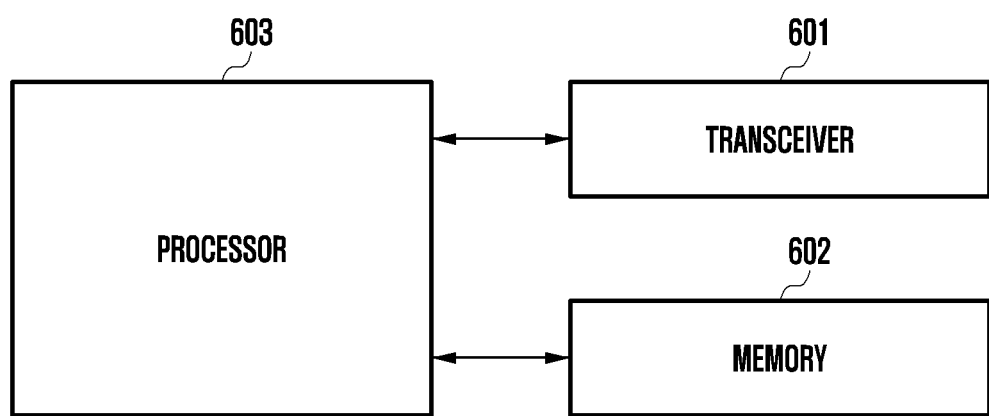
FIG. 6 is a block diagram illustrating an internal structure of a terminal according to an embodiment of the disclosure.
Figure 7:
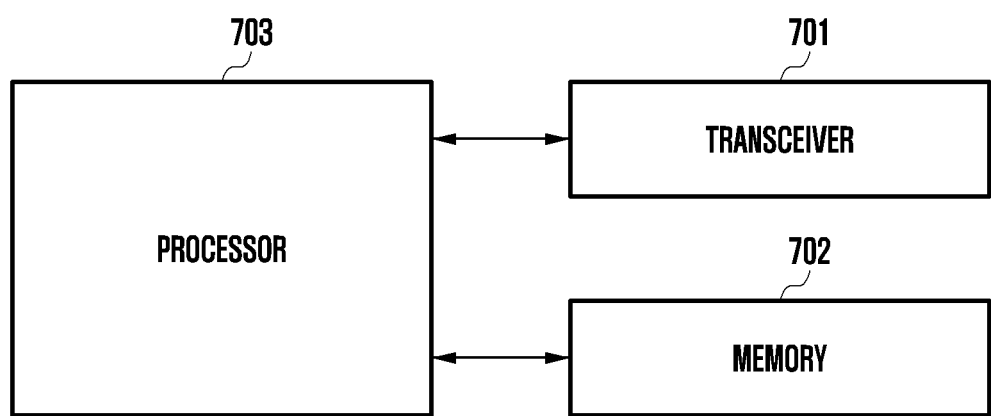
FIG. 7 is a block diagram illustrating an internal structure of a base station according to an embodiment of the disclosure.

In order to perform the embodiments of the disclosure, transceivers, memories, and processors of the terminal and the base station are illustrated in FIG. 6 and FIG. 7, respectively. A terminal support information transmission method, a downlink buffer state transmission/reception method, and a transmission/reception method of the base station and the terminal, for applying data transmission/reception according to the methods above, which correspond to the embodiments, are illustrated. Further, in order to perform the methods, the respective transceivers, memories, and processors of the base station and the terminal need to operate according to the embodiments.

FIG. 6 is a block diagram illustrating a structure of a base station according to an embodiment. Referring to FIG. 6, a base station may include a transceiver 601, a memory 602, and a processor 603. However, the elements of the terminal are not limited to the above examples. For example, the terminal may include more elements or fewer elements than the aforementioned elements. In addition, the transceivers 601, the memory 602, and the processor 603 may be implemented in the form of a single chip.

According to an embodiment, the transceivers 601 may transmit a signal to or receive a signal from a base station. The signal may include control information and data. To this end, the transceiver 601 may include an RF transmitter configured to perform up-conversion and amplification of a frequency of a transmitted signal, an RF receiver configured to perform low-noise amplification of a received signal and perform down-conversion of a frequency, and the like. Further, the transceiver 601 may receive a signal via a wireless channel, may output the signal to the processor 603, and may transmit a signal output from the processor 603 through the wireless channel.

According to an embodiment, the memory 602 may store programs and data necessary for operations of the terminal. The memory 1002 may store control information or data included in a signal transmitted or received by the terminal. The memory 602 may include a storage medium or a combination of storage media, such as a ROM, a RAM, a hard disk, a CD-ROM, and a DVD. Further, the memory 602 may include a plurality of memories. According to an embodiment, the memory 602 may store programs for a method for receiving a downlink control channel and downlink control information by the terminal, data transmission or reception operations according thereto, and the like.

According to an embodiment, the processor 603 may control a series of procedures so that the terminal may operate according to the aforementioned embodiment of the disclosure. For example, the processor 603 may differently control a method for receiving a downlink control channel and downlink control information by a terminal, data transmission or reception operations according thereto, and the like according to an embodiment of the disclosure. The processor 603 may include a plurality of processors, and may execute a program stored in the memory 602, thereby differently controlling a method for receiving a downlink control channel and downlink control information by the terminal, data transmission or reception operations according thereto, and the like according to embodiments of the disclosure.

FIG. 7 is a block diagram illustrating a structure of a base station according to an embodiment. Referring to FIG. 7, a base station may include a transceiver 701, a memory 702, and a processor 703. However, the elements of the base station are not limited to the above examples. For example, the terminal may include more elements or fewer elements than the aforementioned elements. In addition, the transceivers 701, the memory 702, and the processor 703 may be implemented in the form of a single chip.

According to an embodiment, the transceivers 701 may transmit a signal to or receive a signal from the terminal. The signal may include control information and data. To this end, the transceiver 701 may include an RF transmitter configured to perform up-conversion and amplification of a frequency of a transmitted signal, an RF receiver configured to perform low-noise amplification of a received signal and perform down-conversion of a frequency, and the like. Further, the transceiver 701 may receive a signal via a wireless channel, may output the signal to the processor 703, and may transmit a signal output from the processor 703 through the wireless channel.

According to an embodiment, the memory 702 may store programs and data necessary for operations of a terminal. The memory 702 may store control information or data included in a signal transmitted or received by a terminal. The memory 702 may include a storage medium or a combination of storage media, such as a ROM, a RAM, a hard disk, a CD-ROM, and a DVD. Further, the memory 702 may include a plurality of memories. According to an embodiment, the memory 702 may store programs for a method for transmitting a downlink control channel and downlink control information by a base station, data transmission or reception operations according thereto, and the like.

According to an embodiment, the processor 703 may control a series of procedures so that the base station may operate according to the above-described embodiment of the disclosure. For example, the processor 703 may differently control a method for transmitting a downlink control channel and downlink control information for a terminal, data transmission or reception according thereto, and the like according to an embodiment of the disclosure. The processor 703 may include a plurality of processors, and may execute a program stored in the memory 702, thereby differently controlling a method for receiving a downlink control channel and downlink control information by a terminal, data transmission or reception operations according thereto, and the like according to embodiments of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto based on the technical idea of the disclosure. Further, the above respective embodiments may be employed in combination, as necessary. For example, the embodiments of the disclosure may be partially combined to operate a base station and a terminal. Further, the embodiments of the disclosure may be applied to other communication systems, and other variants based on the technical idea of the embodiments may also be implemented.

The invention claimed is:

1. A method performed by a terminal in a wireless communication system, the method comprising:
receiving, from a base station, configuration information including information indicating a scheduling cell;
monitoring control information based on the configuration information;
identifying a cyclic redundancy check (CRC) of the control information and a new data indicator (NDI) field in the control information, in case that a downlink (DL) semi-persistent scheduling (SPS) or an uplink (UL) grant type 2 is configured for the scheduling cell, wherein the control information includes a carrier indicator field corresponding to the scheduling cell;

identifying whether the DL SPS or the UL grant type 2 is released for the scheduling cell based on special fields in the control information, in case that the CRC of the control information is scrambled with a configured scheduling—radio network temporary identifier (CS-RNTI) and the NDI field in the control information is set to 0; and releasing the DL SPS or the UL grant type 2 for the scheduling cell, based on the special fields being set to predetermined values.

2. The method of claim 1, wherein the control information is based on a downlink control information (DCI) format 0_1 or a DCI format 1_1.

3. The method of claim 2, wherein the special fields include a hybrid automatic repeat request (HARQ) process number, a redundancy version (RV), a modulation and coding scheme (MCS), and a frequency domain resource allocation (FDRA).

4. The method of claim 3,
wherein a predetermined value of all bits of the HARQ process number is 0,
wherein a predetermined value of all bits for the RV is 0,
wherein a predetermined value of all bits for the MCS is 1, and
wherein a predetermined value of all bits for the FDRA is configured based on a resource allocation type.

5. The method of claim 4, wherein, in case that the control information is based on the DCI format 1_1:
the predetermined value of all bits for the FDRA is 0, in case that the resource allocation type is 0, and
the predetermined value of all bits for the FDRA is 1, in case that the resource allocation type is 1.

6. A method performed by a base station in a wireless communication system, the method comprising:
transmitting, to a terminal, configuration information including information indicating a scheduling cell;
generating control information based on the configuration information; and
transmitting, to the terminal, the control information,
wherein the control information includes a carrier indicator field corresponding to the scheduling cell,
wherein a cyclic redundancy check (CRC) of the control information is scrambled with a configured scheduling—radio network temporary identifier (CS-RNTI) and a new data indicator (NDI) field in the control information is set to 0, and
wherein a downlink (DL) semi-persistent scheduling (SPS) or an uplink (UL) grant type 2 configured for the scheduling cell is released based on special fields in the control information being set to predetermined values.

7. The method of claim 6, wherein the control information is based on a downlink control information (DCI) format 0_1 or a DCI format 1_1.

8. The method of claim 7, wherein the special fields include a hybrid automatic repeat request (HARQ) process number, a redundancy version (RV), a modulation and coding scheme (MCS), and a frequency domain resource allocation (FDRA).

9. The method of claim 8,
wherein a predetermined value of all bits of the HARQ process number is 0,
wherein a predetermined value of all bits for the RV is 0,
wherein a predetermined value of all bits for the MCS is 1, and
wherein a predetermined value of all bits for the FDRA is configured based on a resource allocation type.

10. The method of claim 9, wherein, in case that the control information is based on the DCI format 1_1:
the predetermined value of all bits for the FDRA is 0, in case that the resource allocation type is 0, and
the predetermined value of all bits for the FDRA is 1, in case that the resource allocation type is 1.

11. A terminal in a wireless communication system, the terminal comprising:
a transceiver; and
a controller configured to:
control the transceiver to receive, from a base station, configuration information including information indicating a scheduling cell,
monitor control information based on the configuration information,
identify a cyclic redundancy check (CRC) of the control information and a new data indicator (NDI) field in the control information, in case that a downlink (DL) semi-persistent scheduling (SPS) or an uplink (UL) grant type 2 is configured for the scheduling cell, wherein the control information includes a carrier indicator field corresponding to the scheduling cell,
identify whether the DL SPS or the UL grant type 2 is released for the scheduling cell based on special fields in the control information, in case that the CRC of the control information is scrambled with a configured scheduling—radio network temporary identifier (CS-RNTI) and the NDI field in the control information is set to 0, and
release the DL SPS or the UL grant type 2 for the scheduling cell, based on the special fields being set to predetermined values.

12. The terminal of claim 11, wherein the control information is based on a downlink control information (DCI) format 0_1 or a DCI format 1_1.

13. The terminal of claim 12, wherein the special fields include a hybrid automatic repeat request (HARQ) process number, a redundancy version (RV), a modulation and coding scheme (MCS), and a frequency domain resource allocation (FDRA).

14. The terminal of claim 13,
wherein a predetermined value of all bits of the HARQ process number is 0,
wherein a predetermined value of all bits for the RV is 0,
wherein a predetermined value of all bits for the MCS is 1, and
wherein a predetermined value of all bits for the FDRA is configured based on a resource allocation type.

15. The terminal of claim 14, wherein, in case that the control information is based on the DCI format 1_1:
the predetermined value of all bits for the FDRA is 0, in case that the resource allocation type is 0, and
the predetermined value of all bits for the FDRA is 1, in case that the resource allocation type is 1.

16. A base station in a wireless communication system, the base station comprising:
a transceiver; and
a controller configured to:
control the transceiver to transmit, to a terminal, configuration information including information indicating a scheduling cell,
generate control information based on the configuration information, and control the transceiver to transmit, to the terminal, the control information, wherein the control information includes a carrier indicator field corresponding to the scheduling cell, wherein a cyclic redundancy check (CRC) of the control information is scrambled with a configured scheduling — radio network temporary identifier (CS-RNTI) and a new data indicator (NDI) field in the control information is set to 0, and wherein a downlink (DL) semi-persistent scheduling (SPS) or an uplink (UL) grant type 2 configured for the scheduling cell is released based on special fields in the control information being set to predetermined values.

17. The base station of claim 16, wherein the control information is based on a downlink control information (DCI) format 0_1 or a DCI format 1_1.

18. The base station of claim 17, wherein the special fields include a hybrid automatic repeat request (HARQ) process number, a redundancy version (RV), a modulation and coding scheme (MCS), and a frequency domain resource allocation (FDRA).

19. The base station of claim 18, wherein a predetermined value of all bits of the HARQ process number is 0, wherein a predetermined value of all bits for the RV is 0, wherein a predetermined value of all bits for the MCS is 1, and wherein a predetermined value of all bits for the FDRA is configured based on a resource allocation type.

20. The base station of claim 19, wherein, in case that the control information is based on the DCI format 1_1:

the predetermined value of all bits for the FDRA is 0, in case that the resource allocation type is 0, and the predetermined value of all bits for the FDRA is 1, in case that the resource allocation type is 1.

* * * * *